United States Patent [19]

Magnenet

[11] 4,138,702
[45] Feb. 6, 1979

[54] HEAD ARRANGEMENT FOR PERPENDICULAR RECORDING INFORMATION ON A MAGNETIC RECORD CARRIER

[75] Inventor: Jean G. Magnenet, Belfort, France

[73] Assignee: Compagnie Honeywell Bull, Paris, France

[21] Appl. No.: 854,682

[22] Filed: Nov. 25, 1977

Related U.S. Application Data

[63] Continuation of Ser. No. 651,156, Jan. 21, 1976, abandoned.

[30] Foreign Application Priority Data

Jan. 23, 1975 [FR] France .............................. 75 02137

[51] Int. Cl.$^2$ .................... G11B 5/14; G11B 5/115; G11B 5/27
[52] U.S. Cl. .................................. 360/125; 360/121; 360/129
[58] Field of Search ................. 360/121, 129, 125–127

[56] References Cited

U.S. PATENT DOCUMENTS

| | | | |
|---|---|---|---|
| 3,427,408 | 2/1969 | Lempert et al. | 360/74 |
| 3,486,220 | 12/1969 | Braun et al. | 360/129 |
| 3,810,191 | 5/1974 | Stauffer | 360/127 |

*Primary Examiner*—Robert S. Tupper
*Attorney, Agent, or Firm*—Cameron, Kerkam, Sutton, Stowell & Stowell

[57] ABSTRACT

An arrangement for recording information on a magnetic record carrier, having at least one magnetic recording head which incorporates an electromagnet having a core, wherein said arrangement includes a magnetic shunt, said magnetic shunt and the magnetic core of the electromagnet being adapted to be arranged on either side of said record carrier and close thereto, so as to form a closed magnetic circuit in which the magnetic flux is substantially perpendicular to the surface of the carrier, the said core having a recording pole and a flux-closing pole and the cross-section of the recording pole being smaller than that of the flux-closing pole.

9 Claims, 15 Drawing Figures

HEAD ARRANGEMENT FOR PERPENDICULAR RECORDING INFORMATION ON A MAGNETIC RECORD CARRIER

This is a Continuation of application, Ser. No. 651,156, filed Jan. 21, 1976, now abandoned.

The present invention relates to an arrangement for recording information on a magnetic record carrier.

BACKGROUND OF THE INVENTION

The principle of recording information on a magnetic recod carrier is well known. It consists in using at least one magnetic recording head to magnetise the record carrier, which is moving close to the said head.

It will be recalled that in order to magnetise a magnetic material, it is first subjected to a magnetic field the strength of which is sufficiently great to saturate the material, that is to say sufficiently great that the induced magnetism in the material reaches a limiting value Bs as soon as the strength H of the magnetic field reaches a given value Hs. The magnetic field is then cut off. Within the material there then remains a certain level of induced magnetism, termed the residual flux density.

Magnetic record carriers are of two types, namely:
longitudinally magnetised carriers in which the orientation of the induced magnetism is parallel to the surface of the carrier; and
transversely magnetised carriers in which the orientation of the induced magnetism is perpendicular to the surface of the carrier.

In present day practice, arrangements for recording information on magnetic record carriers are formed by the combination of a longitudinally magnetised magnetic record carrier and at least one recording head formed by an electromagnet.

The pole gap is a very narrow opening the width of which does not exceed a few microns so that the lines of induced force are concentrated in the air.

There are, however, lines of force which close the magnetic circuit of the electrogmagnet between the two poles outside the pole gap and which represent magnetic leakage at the tap. The strength of the leakage decreases with distance from the pole gap. It is through this leakage field that the record carrier moves past the head. When a current is passed through the coil of the electromagnet a magnetic field is set up in the said magnetic circuit.

To magnetise the carrier properly it is necessary to use a relatively high current. To record a series of items of information on the carrier, the coil is fed with a current of varying strength, which creates on the carrier a succession of small magnetic areas termed "elementary magnetic areas" the size of which is of the same order as the pole gap.

Such arrangements for recording information on magnetic record carriers have the following disadvantages:
The benefit of the maximum magnetic field in the pole gap is lost;
Since the distance between the magnetic head and the record carrier is small, there is a possibility of contact between the carrier and the head, and hence a danger of the carrier wearing quickly, which makes it necessary for the head to be machined and fitted to very close tolerances;
The electromagnetic efficiency of the head is very low, since when a large amount of power is applied to the coil, only a small magnetic power is received;
The high cost of the head.

Such arrangements, although well suited to magnetic record carriers having high information densities (that is to say on which the number of elementary magnetic areas per unit of length is high), are less well suited to carriers having low and medium information densities, where the length of the elementary magnetic areas is very much greater than that of the pole gap.

In this latter case, information can only be recorded by causing the carrier to move continuously at a constant speed. It is therefore impossible to envisage quasi-instantaneous recording which would enable the magnetic carrier to move forward step-by-step and data item by data item.

It is an object of the present invention to enable these disadvantages to be substantially reduced or overcome.

SUMMARY OF THE INVENTION

The invention provides a simple and inexpensive arrangement for recording information on a magnetic record carrier which requires only a small amount of electrical energy to magnetise the magnetic record carrier and which allows information to be recorded quasi-instantaneously both with the record carrier moving continuously and with it moving step-by-step.

An arrangement according to the invention for recording information on a magnetic record carrier has at least one magnetic recording head which incorporates an electromagnet, and is characterised in that it includes a magnetic shunt, the magnetic shunt and the magnetic core of the electromagnet being arranged on either side of the carrier and close thereto to form a closed magnetic circuit in which the magnetic flux is perpendicular to the surface of the carrier, the said core having a recording pole and a fluxclosing pole, the cross-section of the recording pole being smaller than that of the flux-closing pole.

The chief advantage of such an arrangement is that it uses the main flux and not the leakage flux to magnetise the carrier.

BRIEF DESCRIPTION OF THE DRAWINGS

The invention will be better understood from the following description, given by way of non-limiting example, with reference to the accompanying drawings, in which:

FIG. 1 (comprising FIGS. 1a, 1b and 1c) shows, in the form of simplified diagrams, examples of magnetic record carriers magnetised on different principles.

DESCRIPTION OF THE PREFERRED EMBODIMENT

Figures 1, 1A, 1B, 1C:
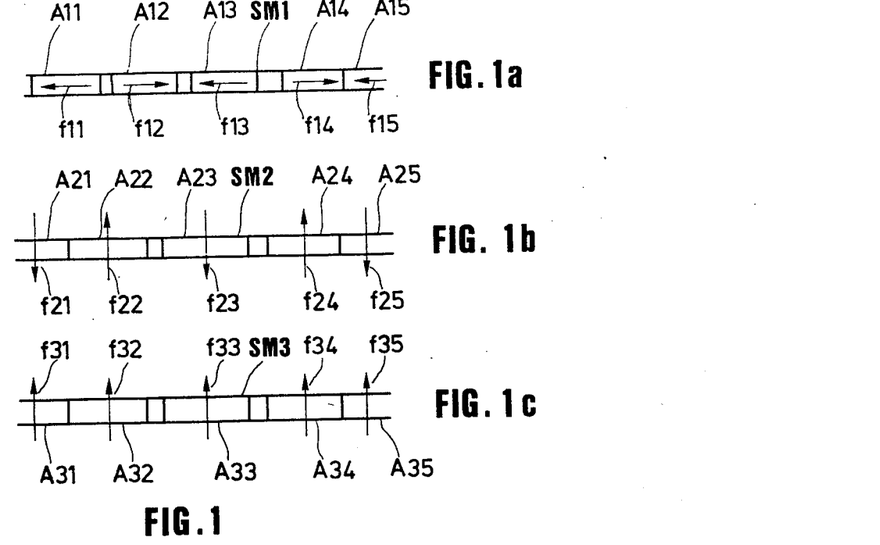
Figure 2:
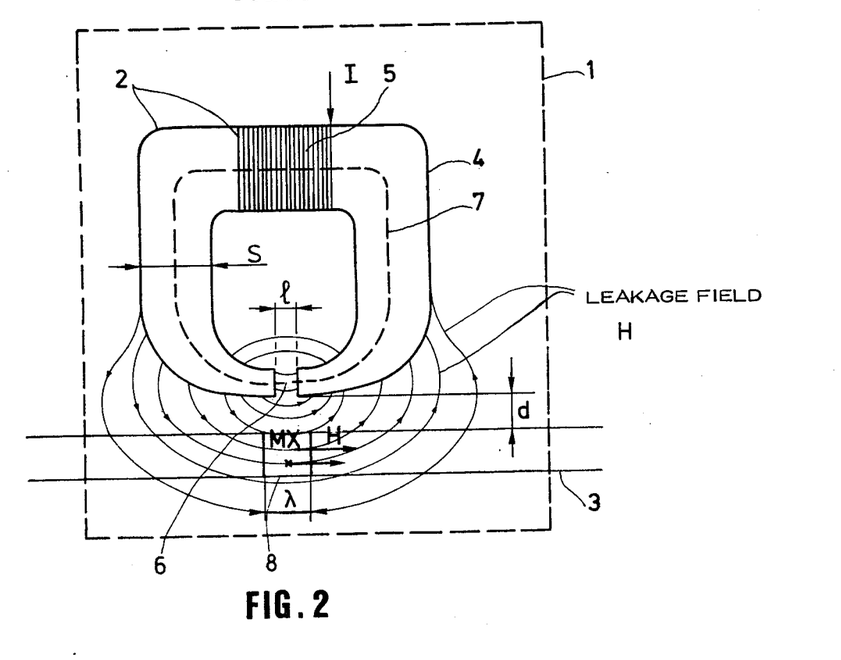
FIG. 2 shows a known type of arrangement for recording information on a magnetic record carrier, FIG. 3 (comprising FIGS. 3a to 3d) illustrates the principle of the arrangement according to the invention for recording information on a magnetic record carrier.

In order properly to understand the principle of operation of the arrangement according to the invention for recording information on magnetic record carriers, it is necessary briefly to review the various types of magnetic record carriers, as illustrated by FIG. 1, and known recording arrangements as illustrated by FIG. 2.

FIG. 1 shows three magnetic record carriers SM1, SM2, SM3 which use different principles of magnetisation. Because of their small thickness the carriers concerned may be likened to plane surfaces. For the sake of simplicity only a small number of elementary magnetic areas are shown on the carriers.

FIG. 1a shows a longitudinally magnetised carrier SM1. The axes of magnetisation f11 to f15 which define the orientation and direction of the induced magnetism in the elementary areas of magnetisation A11 to A15 are parallel to carrier SM1 and lie alternately in opposite directions. Thus the direction of axis f11 is opposite from that of axis f12, the direction of axis f12 is opposite to that of axis f13, and so on.

FIG. 1b shows a transversely magnetised carrier SM2. The axes of magnetisation f21 to f25 of the elementary magnetic areas A21 to A23 are perpendicular to support SM2 and alternate in direction.

FIG. 1c shows a transversely magnetised carrier SM3 in which the axes of magnetisation f31 to f35 of the elementary magnetic areas A31 to A33 all lie in the same direction.

FIG. 2 shows a known type of arrangement, generally indicated at 1, for recording information on magnetic record carriers, which is frequently used in present day practice. The arrangement 1 consists of at least one magnetic recording head 2 and a horizontally magnetised magnetic record carrier 3 (see carrier SM1 in FIG. 1).

The magnetic recording head 2 consists of a laminated magnetic core 4, on which is wound a coil 5. The magnetic core 4 is interrupted by an air-gap 6 whose width is very small (a few microns). The cross-section S of the core 4 is at a minimum at the pole gap 6. The magnetic carrier moves past at a distance d, of a few microns, from the pole gap.

The way in which the recording arrangement 1 operates is as follows: the coil 5 of head 2 is supplied with a current I provided by an external supply circuit which is not shown in FIG. 2. This current I sets up within the magnetic core 4 a magnetic field H whose mean line of force 7 is shown in broken lines in FIG. 2. The field H is at a maximum in the air gap 6. The result is that there is high leakage in the vicinity of the air gap, as can be seen from FIG. 2.

This leakage magnetises the magnetic carrier 3 and, in the vicinity of point M, creates an elementary area of magnetism 8 the length $\lambda$ of which is substantially the same as the width l of the pole gap 6 and in which the induced magnetism when current I ceases to flow is equivalent to the residual flux density.

For the strength of the leakage from field H to be sufficiently strong to magnetise the magnetic carrier 2, the current I in coil 6 needs to be relatively high, which causes head 2 to heat up. This heating up is even more marked when the device 1 comprises a large number of heads identical to head 2 and arranged in parallel, which makes it necessary to have a special cooling arrangement for the heads.

If it is desired to use arrangement 1 to generate on the magnetic record carrier 2 elementary magnetic areas whose length is considerably more than a few microns, that is to say in the case of magnetic carriers of low or medium information density, there are two possible ways of doing this:

(1) either, with the width l of the pole gap remaining of the order of a few microns, moving the carrier past the pole gap at high speed, coil 5 being supplied with current for the whole time which is required to generate an elementary magnetic area of the requisite length whilst the carrier is moving past.

In this case:
   the heads heat up to an even greater extent than indicated above;
   it is impossible to envisage any possibility of the magnetic carrier 3 being advanced step-by-step.

(2) or, increasing the width of the pole gap. In this case the leakage from field H is greater and it is necessary to supply coil 5 with a higher current than when the width of the pole gap is of the order of a few microns, which likewise results in excessive heating up of head 2.

Figure 3:
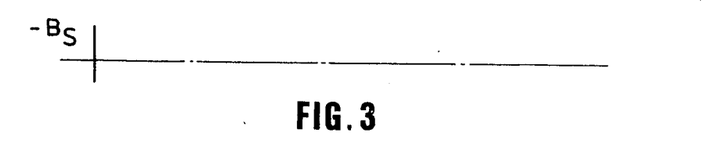

The recording arrangement shown in FIG. 3 makes it possible to avoid these disadvantages and those already mentioned above, namely the fact that the maximum field H in the pole gap 6 is not used, that distance d is too small and causes the carrier 3 to suffer mechanical wear, the high cost of the heads, and so on.

Figure 3A:
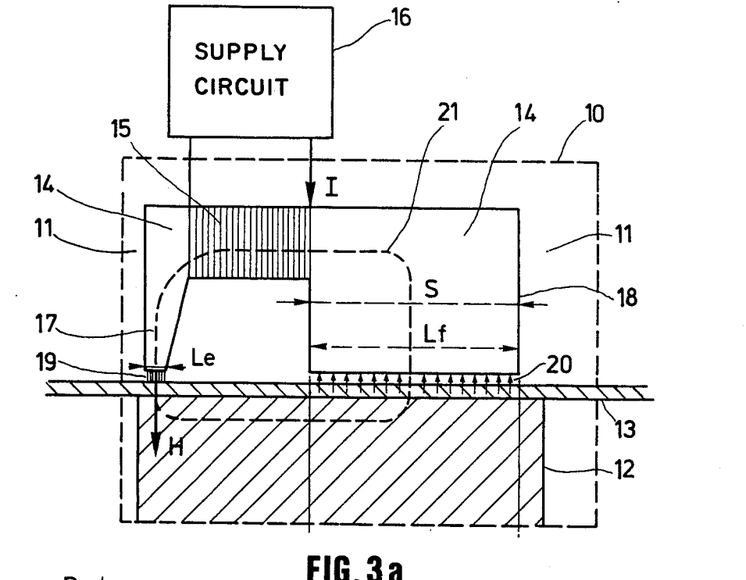

As can be seen from FIG. 3a, the arrangement 10 according to the invention for recording information on a magnetic record carrier consists of: at least one magnetic recording head 11, a magnetic shunt 12, and a transversely magnetised magnetic record carrier 13.

The magnetic recording head 11 has a magnetic core 14 on which is wound a coil 15 which is connected to an external supply circuit 16. The magnetic core 14 has a recording pole 17 and a flux-closing pole 18. Coil 15 is wound between pole 17 and pole 18. If Le is the width of the recording pole 17 and Lf the width of the flux closing pole 18, it is constructionally arranged that $Lf > Le$. The magnetic shunt 12 is formed from a material of high magnetic permeability.

Preferably, the magnetic carrier 13 is a transversely magnetised one of type SM3 (See FIG. 1c), there then being only a fairly small risk with this type of magnetisation of adjoining elementary magnetic areas demagnetising one another.

The space between the recording pole 17 and the magnetic shunt 12 forms a pole gap 19 for pole 17. Similarly, the space between the flux-closing pole 18 and the magnetic shunt 12 forms a pole gap 20 for pole 18. It can be seen that magnetic core 14 and shunt 12 form a closed magnetic circuit having two pole gaps through which the magnetic record carrier 3 passes.

The manner in which the recording arrangement 10 according to the invention operates is as follows: Supply circuit 16 transmits a current I to coil 15. This current I sets up within the magnetic core 14 a magnetic field H whose mean line of force is represented by broken line 21. In the pole gap 19 for the recording pole 17, field H is perpendicular to the magnetic carrier 3, which is thus magnetised in the proper transverse fashion. Since the magnetic shunt 12 is of high permeability, the lines of force of magnetic field H do not penetrate deeply into the shunt and are quickly closed, which reduces magnetic leakage.

Figure 3B:
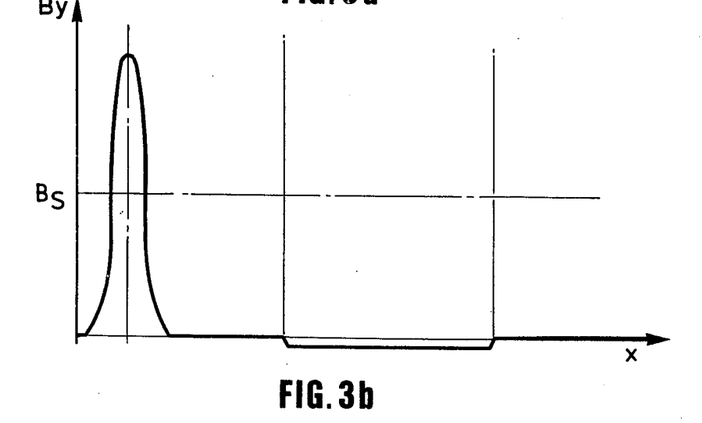

FIG. 3b shows the difference in the magnetic flux By which is generated by head 11 in the two pole gaps 19 and 20, as measured perpendicularly to the magnetic carrier 3. It can be seen that this flux is much stronger in pole gap 19 than in pole gap 20. This results from the fact that the magnetic flux is virtually constant in the magnetic circuit formed by magnetic core 14 and shunt 12 and that the cross-section S of this circuit is greater at pole gap 20 than at pole gap 19. In pole gap 19, the magnetic flux By is greater than the saturation flux density Bs of carrier 3 for a relatively low current level I in coil 15. On the other hand, in pole gap 20 the induced magnetic flux By is very much less than the saturation flux density Bs. Thus the fluxclosing pole 18 can neither record information on magnetic carrier 3 nor interfere with the information recorded by recording pole 17.

Figure 3C:
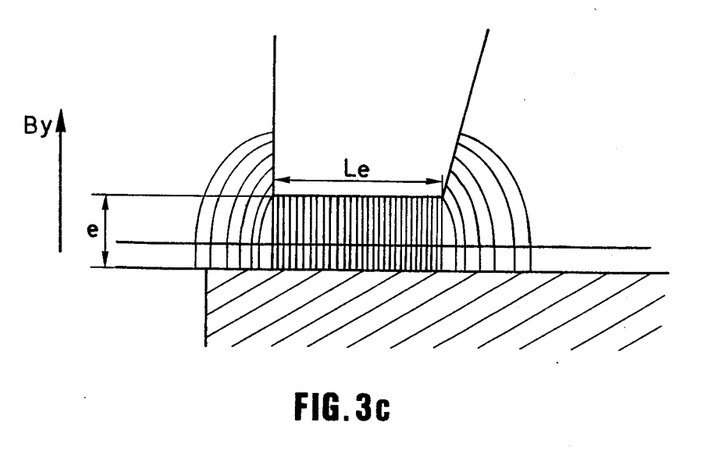
Figure 3D:
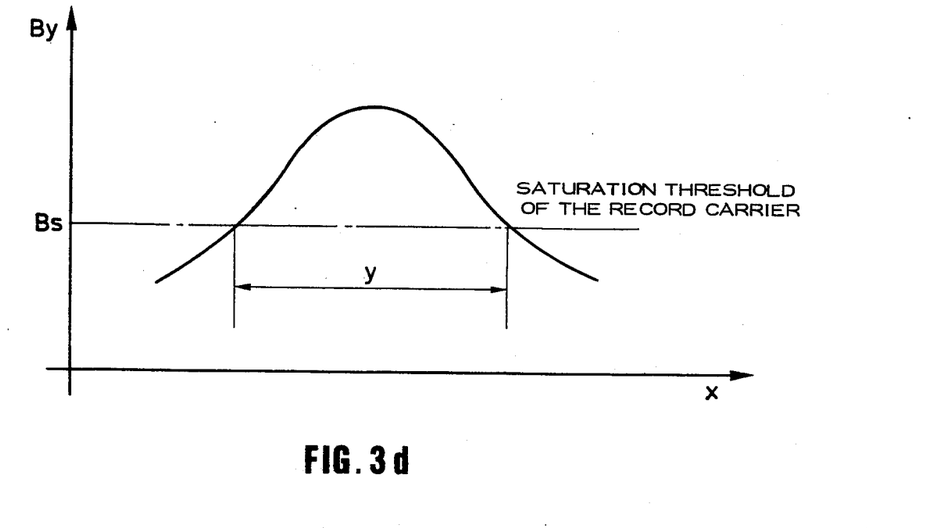

In FIG. 3c is shown the form of the lines of induced flux near and in the pole gap 19 for the recording pole 17, and in FIG. 3d is shown a graph representing induced flux By near and in pole gap 19.

It can be seen that, for a pole gap 19 of width e and a recording pole 17 of length Le, the induced flux density By is greater than the saturation flux density Bs over a length y greater than Le. In other words, with a pole gap of width e and a recording pole 17 of length Le, there is generated on carrier 3 an elementary magnetic area of length y. Consequently, by making width e and length Le of suitable sizes it is possible to create on carrier 3 an elementary magnetic area of the requisite length. The recording device according to the invention is thus able to be used whatever the density of the information which it is desired to record on carrier 3.

In addition, the information can be recorded either with the carrier 3 moving past continuously or with the carrier 3 moving step-by-step, in which latter case the recording of information takes place when the carrier is stopped.

Furthermore, the length of the magnetic core 14 may be very long, which allows the number of turns in coil 15 to be increased. Since the magnetic field H in pole gap 19 is proportional to this member of turns, the current I in the coil may be reduced but the strength of field H is still sufficiently great to magnetise carrier 3. The arrangement according to the invention thus allows the energy required to record information to be reduced.

Finally, it can be shown that the time required by the arrangement according to the invention to record an elementary magnetic area of carrier 13 is practically equal to the time taken by the magnetic flux in core 14 to reach its maximum level from the moment at which current I is fed to coil 15. This time is very short and, as a consequence:

(1) little electrical energy is used to feed the coil, and thus the head heats up only slightly.

(2) the time taken to record an elementary magnetic area is practically independent of the size of the area.

Figure 4:
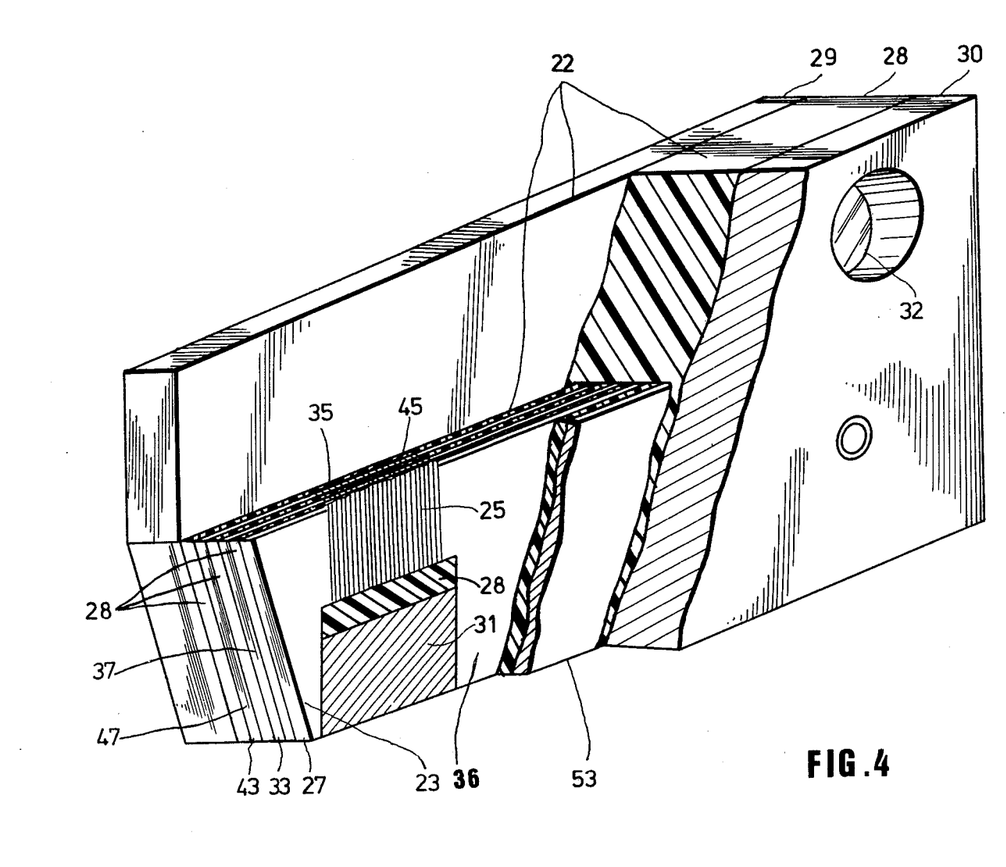
FIG. 4 is a cut-away three-quarters perspective view showing one embodiment of a set of magnetic heads for a recording arrangement according to the invention, FIG. 5 (comprising FIGS. 5a and 5b) shows another embodiment of a set of magnetic heads for a recording arrangement according to the invention, FIG. 5a being a view from below, and FIG. 5b being a cross-sectional view from the side.

FIGS. 4 and 5 show two embodiments of magnetic recording head modules.

FIG. 4 shows a module 22 containing four recording heads 23, 33, 43 and 53. Three of the heads, 23 to 43, are shown in their entirety whereas only part of head 53 is shown. In FIG. 4 can be clearly seen the coil 25, the closure pole 36, and the recording pole 27, of head 23. Also visible are the tops of the coils 35 and 45 associated with heads 33 and 43, the ends of whose recording poles 37 and 47 can be seen. Recording heads 23 to 53 are encapsulated in a moulding of non-magnetic material 28. Each head is separated from its neighbour by a portion of this encapsulation 28. Because of this, any cross-talk phenomena between the heads (i.e. disturbance of the magnetic field of one head by the magnetic field of the neighbouring head or heads) is suppressed.

The module 22 containing the four magnetic recording heads 23 to 53 is secured between two side plates 29, 30 and is mounted on a locating piece 31. The module has a fixing hole 32 by means of which it can either be associated with other modules or attached to the framework (not shown) of a machine for recording information on magnetic record carriers.

Figure 5A:
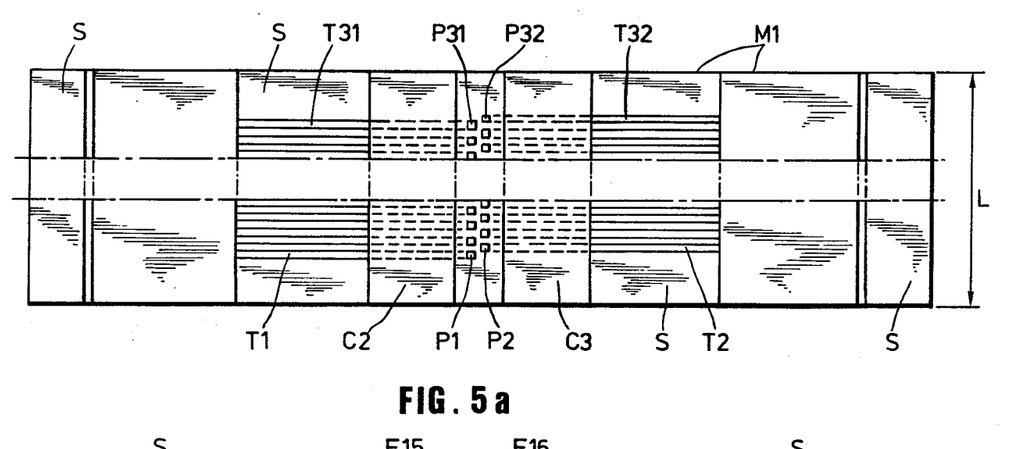
Figure 5B:
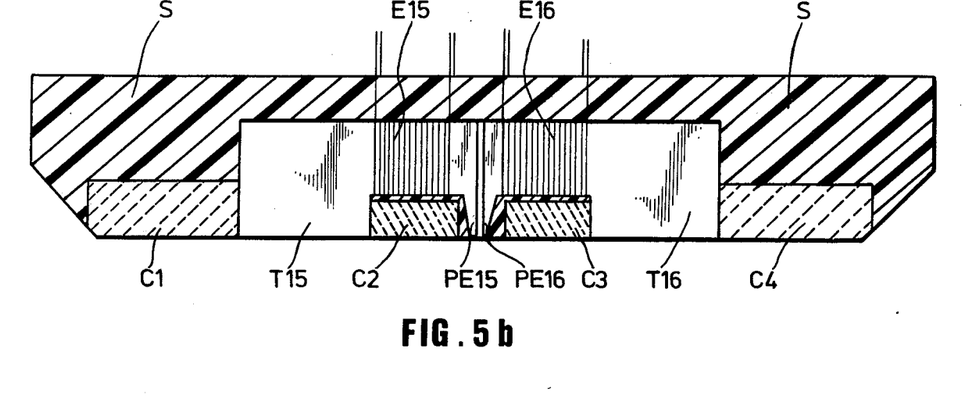

FIG. 5 shows an embodiment of a module M1 containing thirty two recording heads, FIG. 5a being a view from below and FIG. 5b a cross-sectional view from the side.

The heads are encapsulated within a moulding of non-magnetic material S and are located by four ceramic locating pieces C1, C2, C3 and C4.

As can be seen in FIG. 5a, the thirty-two heads are divided into two groups of sixteen, the first group consisting of the odd heads T1, T3 to T31 and the second group of the even heads T2, T4 to T32. Heads T1 to T32 are mounted in an opposing arrangement with the odd heads T1 to T31 all arranged to the left of the Figure and the even heads T2 to T32 to the right. In FIG. 5a the dots P1 to P31 and P2 to P32 indicate the ends of the recording heads. The oppositely directed arrangement is adopted from considerations of ease in accommodating the heads.

In FIG. 5b are shown two of the thirty-two heads, namely heads T15 and T16, with their coils E15 and E16 and their recording poles PE15 and PE16. The recording heads and the head modules such as 22 and M1 are simple and inexpensive to produce.

The existence of recording head modules makes it possible to produce a very wide range of recording devices according to the invention, from devices having a single recording head to ones having more than a thousand such heads.

FIG. 6 shows different types of magnetic record carriers which are preferably used in the recording arrangements according to the invention.

Figure 6A:
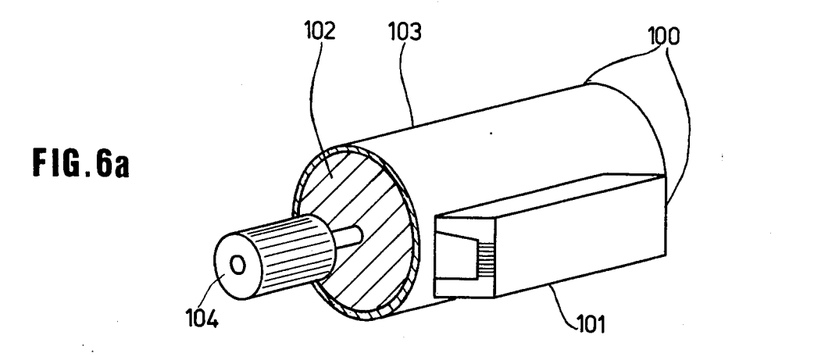
FIG. 6 shows two embodiments of recording arrangement according to the invention which use magnetic carriers of different forms.

FIG. 6a shows a recording arrangement 100 in which the magnetic shunt 102 is a solid cylinder of a material of high magnetic permeability, the magnetic carrier 103 being formed by a thin film of magnetic material applied to the entire surface of the cylinder.

Arrangement 100 has a plurality 101 of recording heads. Depending upon the use which it is desired to make of arrangement 100 (parallel, series, or mixed recording) the plurality 101 of recording heads may cover the whole or only part of the length of the combination formed by shunt 102 and carrier 103.

The plurality 101 of recording heads is formed for example by joining together, in parallel, one or more head modules such as module M1 in FIG. 5.

Magnetic shunt 102 and carrier 103 are driven in rotation by an electrical motor 104.

This motor may be either a constant speed DC motor or a stepping motor, in which latter case the recording of information on the carrier 103 taking place when the motor 104 is stopped.

Figure 6B:
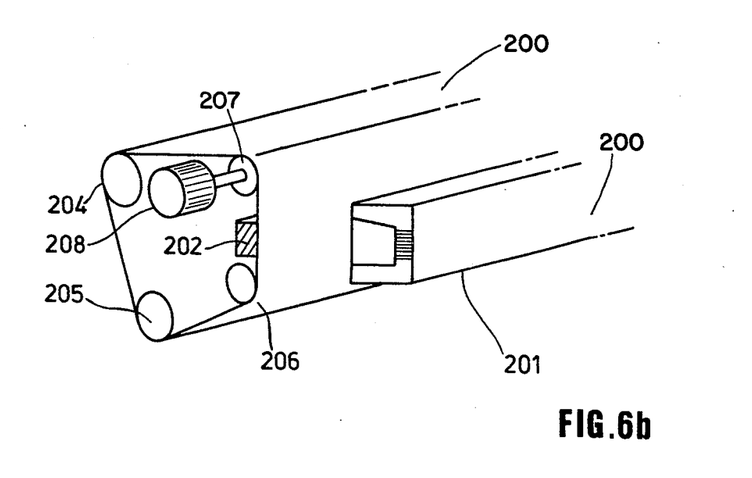

FIG. 6b shows a recording arrangement 200 in which the magnetic carrier is an endless magnetic band 203 which is mounted on tension on rollers 204 to 207, the band being held pressed against the magnetic shunt 202, which is a bar of high magnetic permeability. Arrangement 200 includes a plurality 201 of magnetic recording heads, this plurality 201 being formed in an identical way to the plurality 101 of heads in device 100 of FIG. 6a. The movement of band 203 is effected by an electric motor 208 which drives roller 207 in rotation, the other rollers being free to rotate.

Although there is described above and shown in the drawings arrangements for recording information in which the magnetic record carriers are an endless band and a drum, it is understood that any recording arrangement which uses, for example, magnetic carriers of a different form does not depart from the scope of the invention.

I claim:

1. An arrangement for recording information on a magnetic record carrier comprising a plurality of magnetic recording heads, each said magnetic recording head including an electromagnet, a recording pole and a flux closing pole, the cross-section of the pole face of the recording pole being smaller than the cross-section of the pole face of the flux closing pole, a magnetic shunt, said magnetic shunt being disposed on one side of said record carrier and close thereto and each said magnetic recording head being disposed on the other side of said record carrier and close thereto, so as to form a gap of constant dimension with said magnetic shunt and a closed magnetic circuit in which the magnetic flux is substantially perpendicular to the surface of the carrier, nonmagnetic encapsulation means for supporting said recording heads as a modular unit in parallel arrangement, each said recording head being separated from the adjoining head by said nonmagnetic encapsulation means and a first and second side plate disposed over said encapsulation means and adjacent the end-most sides of said parallel arranged recording heads.

2. An arrangement according to claim 1 in which the magnetic shunt is a cylinder of a material having high magnetic permeability, and the magnetic record carrier is a film of magnetic material on the surface of the cylinder, and further including electric motor means for rotatably driving the cylinder such that the surface of the cylinder rotates past the poles of the recording heads.

3. An arrangement according to claim 1, in which the magnetic record carrier is an endless magnetic band and said magnetic shunt is a bar of high magnetic permeability, means for mounting said band on a plurality of rollers, the band being applied against the magnetic shunt, and electric motor means for rotatably driving one of the rollers, the other rollers being free to turn.

4. An arrangement according to claim 1, wherein the plurality of recording heads comprises two groups of heads, each group comprising a like number of heads, and the heads of one of said group being disposed in staggered relationship with the heads of the other group.

5. An arrangement for recording information on a magnetic record carrier comprising a plurality of magnetic recording heads, each said head including an electromagnet having a core and a winding, means for connecting said core windings to a current generator, each said core having a recording pole and a flux-closing pole and the cross-section of the pole face of the recording pole being smaller than that of the pole face of the flux-closing pole, a magnetic shunt, said shunt and said magnetic core of each said electromagnet being arranged on opposite sides of said record carrier and close thereto, so as to form gaps of constant dimension between the poles and the shunt and a closed magnetic circuit for each said core in which the magnetic flux associated with each core is perpendicular to the surface of said carrier such that the carrier is transversely magnetized, said magnetic shunt being a cylinder of material having high magnetic permeability, and the magnetic record carrier being film of magnetic material on the surface of the cylinder, and further including electric motor means for rotatably driving the cylinder.

6. An arrangement according to claim 5 further including means for supporting said recording heads in parallel arrangement and forming a modular unit, each recording head of the modular unit being separated from the adjoining head by a member of nonmagnetic material.

7. An arrangement for recording information on a magnetic record carrier comprising a plurality of magnetic recording heads, each said head including an electromagnet having a core and a winding, means for connecting said core windings to a current generator, each said core having a recording pole and a flux-closing pole and the cross-section of the pole face of the recording pole being smaller than that of the pole face of the flux-closing pole, a magnetic shunt, said shunt and said magnetic core of each said electromagnet being arranged on opposite sides of said record carrier and close thereto, so as to form gaps of constant dimension between the poles and the shunt and a closed magnetic circuit for each said core in which the magnetic flux associated with each core is perpendicular to the surface of said carrier such that the carrier is transversely magnetized, said carrier being an endless magnetic band moveably supported about at least two rollers and said magnetic shunt being a bar of high magnetic permeability and further including electric motor means for rotatably driving one of said rollers.

8. An arrangement according to claim 7, wherein said magnetic band is held pressed against said magnetic shunt.

9. An arrangement according to claim 7, further including means for supporting said plurality of recording heads in parallel arrangement so as to form a modular unit, each recording head of the modular unit being separated from the adjoining head by a member of non magnetic material.

* * * * *